US005336322A

United States Patent [19]
Tobisawa et al.

[11] Patent Number: 5,336,322
[45] Date of Patent: Aug. 9, 1994

[54] COATING APPARATUS

[75] Inventors: Seiichi Tobisawa; Hironobu Iwashita, both of Hino, Japan

[73] Assignee: Konica Corporation, Tokyo, Japan

[21] Appl. No.: 25,970

[22] Filed: Mar. 3, 1993

[30] Foreign Application Priority Data

Mar. 6, 1992 [JP] Japan .................................. 4-084665

[51] Int. Cl.$^5$ ................................................ B05C 3/12
[52] U.S. Cl. ...................................... 118/410; 118/419; 425/113; 425/461
[58] Field of Search ................ 118/410, 419; 425/461, 425/462, 113

[56] References Cited

U.S. PATENT DOCUMENTS

| | | | |
|---|---|---|---|
| 4,424,761 | 1/1984 | Tanaka et al. | 118/410 |
| 4,574,459 | 3/1986 | Peters | 29/527.4 |
| 5,186,754 | 2/1993 | Umemura et al. | 118/411 |

FOREIGN PATENT DOCUMENTS 4011279 10/1990 Fed. Rep. of Germany .......... B29C 47/02

OTHER PUBLICATIONS

"Preparation of Thin Films", Joy George, Marcel Dekker, 1992.
"Deposition Technologies for Films and Coatings-Developments and Applications", Bunshah et al, Noyes Publications, 1982.

Primary Examiner—Michael W. Ball
Assistant Examiner—Francis J. Lorin
Attorney, Agent, or Firm—Jordan B. Bierman

[57] ABSTRACT

Disclosed is an apparatus for coating by extrusion a coating solution on a surface of a beltlike material continuously running comprising a coater die having a plurality of edges and a slit being provided between said edges, wherein a part of said coater die, which has contact with said beltlike material or said coating solution, is covered with a film having Vickers hardness of not less than HV 1,700 wherein the film is prepared by an ion plating method. The apparatus is capable of achieving a stable coatability.

5 Claims, 2 Drawing Sheets

COATING APPARATUS

FIELD OF THE INVENTION

The present invention relates to a coating apparatus. More particularly, it is concerned with a coating apparatus feasible for trouble-free coating even under high-speed coating conditions when photographic films, photographic papers, magnetic recording mediums or the like are manufactured.

BACKGROUND OF THE INVENTION

Various methods such as roll coating, gravure coating and extrusion coating are used to apply a coating solution, a liquid coating composition, to beltlike materials such as photographic films, photographic papers and magnetic recording mediums. In particular, it is most common to use extrusion coating since it can form uniform coatings.

In the extrusion coating, the shape of a die edge is important in order to stably carry out uniform coating, as disclosed in U.S. Pat. Nos. 5,042,422 and No. 5,097,792.

In such extrusion coating, however, the surface of the beltlike material continuously running may come into touch with the edges of a coater die. For this reason the die edges can not avoid being worn because of the presence of hard fine particles in coating solutions, and a slight deformation due to wear may cause streak defects, resulting in an extreme lowering of coatability. For example, in the case of coating solutions for magnetic recording mediums, it is an important subject to prevent wear of the die edges, since coating solutions often contain fine hard particles, e.g., abrasives such as aluminum oxide and chromium oxide or ferromagnetic powder, and besides there is a demand for making coating speed as higher as possible (100 m/min to 1,000 m/min or more) for the purpose of improving productivity. In the case when coating solutions contain fine hard particles, the slits of the coater die, through which coating solutions pass, may broaden because of their wear to cause a change in extrusion rate of the coating solutions. Thus, it is another subject to prevent wear of the slits.

In addition, in order to stably carry out coating that can be uniform in the width direction, the coater die used in extrusion coating is required to achieve a dimensional precision that is uniform in its width direction. Its precision must be of a micrometric or higher order. Hence, the coater die is usually worked by precision grinding or polishing. During the grinding or polishing, fine particles of the abrasive wheel or abrasive grains used can be included in the working surface of the die. Such fine particles of the abrasive wheel or abrasive grains, included in the edge surface, may come off as s result of peripheral abrasion to cause a deformation of edges and cause troubles such as streak defects, resulting in an extreme lowering of coating performance.

Inclusion of the fine particles of the abrasive wheel or abrasive grains may also cause a corrosion from that portions.

Moreover, particularly in the case of mediums for magnetic recording, there is an increasing demand for smaller film thickness. When film thickness is made smaller, the use of a coater die for a long period of time brings about a problem of low electrical characteristics caused by coating unevenness, coating surface roughness ascribable to the coater die, etc.

In order to prevent wear of die edges or slits, it has been hitherto attempted to increase the strength of die edges by forming the edges of the coater die with a hard metal as disclosed in U.S. Pat. No. 4,424,762, or by forming the coater die itself with a ceramic material as disclosed in .European Patent Publication No. 361,167.

Highly wear resistant materials such as hard metals or ceramic materials, however, bring about an increase in cost of materials and at the same time a difficulty in cutting and abrasion, in proportion to the degree of wear resistance, and hence have a disadvantage that coater dies can only be formed in a very high cost. They also have additional disadvantages as follows: In the case of the hard metals, the wear can not be prevented since some of the fine particles contained in coating solutions have a higher hardness than the hard metals. In the case of the ceramic materials, the die edges tend to chip because of brittleness of the materials and hence it is difficult to delicately shape the edges, in particular, to work sharp angular portions, making it impossible to obtain die edges capable of achieving ideal coatability. They give another disadvantage that, when the shape of die edges has gone beyond the bounds of required precision, the whole coater die must be disused and a new one must be prepared, which is uneconomical and cumbersome.

SUMMARY OF THE INVENTION

Accordingly, an object of the present invention is to provide a coating apparatus having a coater die that can be formed with ease and at a low cost, and capable of achieving a stable coatability.

To achieve the above object, the present inventors made intensive studies, and thus have accomplished the present invention.

The coating apparatus according to the present invention is a coating apparatus for applying by extrusion a coating solution to the surface of a flexible beltlike material continuously running, said coating apparatus comprising an extrusion coater die having been covered with a hard film having a film hardness after covering (Vickers hardness) of not less than Hv 1,700, at least at its part coming into touch with said flexible beltlike material or said coating solution.

In a preferred embodiment of the coating apparatus according to the present invention, i) the die is covered by ion plating, and ii) the hard film is formed of any one of TiN, TiC and DLC (amorphous carbon or diamond-like carbon).

DETAILED DESCRIPTION OF THE INVENTION

Figure 1:
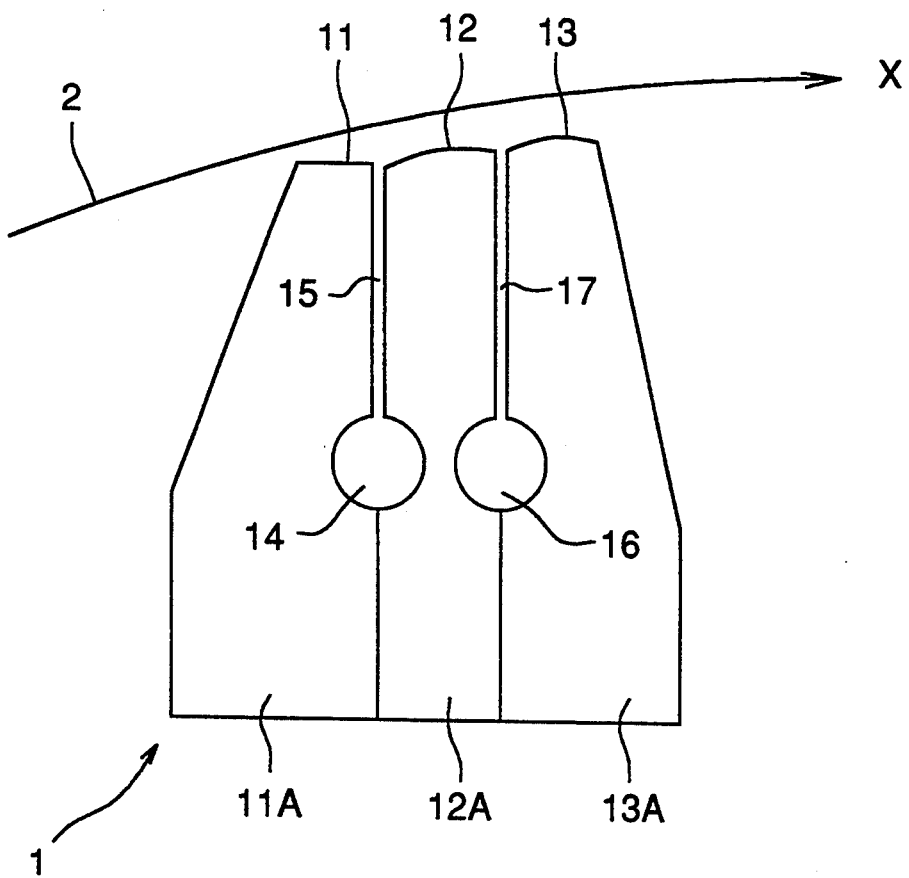
FIG. 1 is a cross-sectional illustration of a coater die used in the coating apparatus according to the present invention.

FIG. 1 is s cross-sectional illustration of a coater die used in the coating apparatus according to the present invention.

In FIG. 1, reference numeral 1 denotes the coater die. The coater die 1 is comprised of a front bar 11a having s front edge surface 11, a center bar 12A having a center edge surface 12 and a back bar 13A having a back edge surface 13, arranged from the upstream side of the direction in which a flexible beltlike material 2 runs. A first slit 15 communicating with a first coating solution reservoir 14 is formed between the front bar 11A and the center bar 12A, and s second slit 17 communicating with a second coating solution reservoir 16 is formed between the center bar 12A and the back bar 13A. The coater die 1 shown in FIG. 1 have the cross-sectional shape, a cross section in the direction in which the flexible beltlike material 2 runs, as the one disclosed by the present applicant in U.S. Pat. No 5,097,792, Example 1 (FIG. 1) thereof. FIG. 1 in the present application illustrates an instance in which coating solutions are applied in two layers and FIG. 2 described later illustrates in which a coating solution is applied in a single layer. Needless to say, the present invention is by no means limited to these and can be applied to an instance in which coating solutions are applied in three or more layers, and also can be applied to an instance in which coating solutions are brought together at the middle of a slit as disclosed in Japanese Patent Publication Open to Public Inspection (hereinafter referred to as "Japanese Patent O.P.I. Publication") No. 268862/1990.

Application of coating solutions to the beltlike material 2 will be described. The beltlike material 2 is forwarded in the direction of an arrow successively over the front edge surface 11, center edge surface 12 and back edge surface 13, in the course of which a first-layer coating solution and a second coating solution are respectively extruded from the outlet of the first slit 15 and the outlet of the second slit 17 through the solution reservoirs 14 and 16 by means of continuous flow pumps (not shown), so that two layers are formed on the surface of the beltlike material 2. The beltlike material 2 will be detailed later.

In the present invention, the coater die is one having been covered with a film having a film hardness after covering (Vickers hardness) of not less than Hv 1,700, at its part coming into touch with the beltlike material, which is the part subjected to wear during coating, and/or at its part coming into touch with the coating solution, more specifically, the front edge surface 11, center edge surface 12 and back edge surface 13, and walls of the first slit 15 and second slit 17. The coater die 1 may be covered with the hard film at least at these parts, and may be covered therewith over the whole thereof.

The edge surfaces 11, 12 and 13 may preferably have a roughness within the center-line average roughness as defined in Japanese Patent O.P.I. Publication No. 207865/1990 (i.e., 5.0 μm or less, preferably 3.0 μm or less, and more preferably 1 μm or less) before and after coating.

The hard film can be formed by the covering means described below.

The covering means may include various known ultra-hard coating methods as exemplified by CVD (chemical vapor deposition), salt bath dipping (TD process), sputtering, and PVD (physical vapor deposition). In particular, it is preferred to use ion plating, which is a method belonging to the PVD. The ion plating is a method having a number of advantages such that it can form good, hard and dense films at a low temperature compared with other methods and also does not care about the types of materials to be treated. According to the type of ionization or vaporization, it is grouped into the mattox process, the RF (radio frequency) process, the ARE (activated reactive evaporation) process, the HCD (hollow cathode discharge) process, the multiple cathode process and the cluster ion beam process. When the covering is carried out in practice, several types among these methods are often used in combination.

The hard film formed by the above method has a film hardness after covering (Vickers hardness) of not less than Hv 1,700, made of, for example, TiC, WC, SiC, TiN, HfN, $Si_3N_4$, $TiB_2$, $Al_2O_3$, $ZrB_2$, HfC, $HfB_2$, $B_4C$, CBN and DLC. In particular, TiN, TiC and DLC are preferred.

In the case when the hard film is formed by ion plating, the coater die may be unfastened, e.g., unscrewed, so as to be brought apart into the three bars 11A, 12A and 13A before the hard film is formed. This is preferable since walls of each slit can be uniformly evenly covered with the hard film.

The Vickers hardness herein used is the value defined in JIS Z2244-1981. As test methods, those prescribed in JIS Z2251-1980 and JIS B7734-1977 can be used. For example, a dynamic ultrafine hardness meter DUH-200, manufactured by Shimadzu Corporation can be used.

The hardness of not less than Hv 1,700 can be achieved by appropriately selecting the thickness according to what is used as materials for the hard film.

As described above, the coater die is covered with a hard film having a film hardness after covering (Vickers hardness ) of not less than Hv 1,700, at its part (s) subjected to wear. Thus it is possible to prevent the edge 11 from being worn because of its touch with the beltlike material 2, or the edge 12 or 13 and/or walls of slits 15 and 17 from being worn because of fine particles included in coating solutions. Moreover, because the surfaces are covered, the fine particles of the abrasive wheel or abrasive grains having been included in the edge surfaces during the grinding or polishing do not come off from the surfaces and also the surfaces do not come in touch with the coating solutions to cause no corrosion from that portions. Hence the coating solutions can be stably uniformly applied. In addition, since the hard film that has covered the specified part(s) takes charge of the prevention of wear, the main body of the coater die 1 can be formed of a material that is readily workable and inexpensive, i.e., stainless steel or die steel as exemplified by SUS420J2, SUS630, SUS440C, SUS304, SKD11 or SKD61. In particular, use of stainless steel, which is used in conventional coater dies and is highly corrosion-resistant, makes it possible to form the coater die with ease and at low cost without changing working conditions conventionally used when coater dies are produced.

Even when the hard film has been worn, the initial performance can be restored by again forming the hard film, and hence it is unnecessary to newly prepare the whole coater die. This is very cost-advantageous and simple. This method of the present invention can be also applied to conventional coater dies to which no countermeasure for the prevention of wear is taken. The edges may preferably have the shape as disclosed in U.S. Pat. No. 5,042,422 and No. 5,097,792.

The beltlike material 2 referred to in the present invention may commonly have a width of 0.3 to 3 mm, a to length of 45 to 20,000 m and a thickness of 2 to 200 μm, and may include flexible beltlike articles comprised of a plastic film such as polyethylene terephthalate film, polyethylene-2,6-naphthalate film, cellulose diacetate film, cellulose triacetate film, cellulose acetate propionate film, polyvinyl chloride film, polyvinylidene chloride film, polycarbonate film, polyimide film or polyamide film; paper; a paper coated or laminated with an α-polyolefin having 2 to 10 carbon atoms, such as polyethylene, polypropylene or an ethylene-butene copolymer; or a metal foil such as aluminum foil, steel foil or tin foil; or beltlike articles comprised of such a beltlike article made to serve as a substrate and provided with a preliminary treated layer formed on its surface. The flexible beltlike material 2 is coated with coating solutions suitable for its uses, as exemplified by photographic light-sensitive coating solutions, magnetic coating solutions and surface-protective, antistatic or lubricating coating solutions, which are applied to their surfaces in a dried coating thickness of 20 μm or less, preferably 10 μm or less, and particularly preferably 4 μm or less. The coated materials are dried and thereafter cut in the desired ring and length. The product thus obtained typically includes various types of photographic films, photographic papers and magnetic tapes.

In the present invention, stable coating can be carried out even in the case of coating solutions containing abrasives or magnetic powders such as aluminum oxide, chromium oxdie, α-alumina, molten alumina, α-iron oxide, silicon oxide, silicon nitride, tungsten carbide, molybdenum carbide, boron carbide, corumdum and boron nitride, in particular, as in the case of magnetic coating solutions.

EXAMPLES

The present invention will be further described below by giving Examples.

The components, proportions, order of operation, etc. shown below can be variously altered so long as what is intended by the present invention does not turn aside. In the following Examples, "part (s)" refers to "part (s) by weight" in all occurrences.

EXAMPLE 1

Using materials as shown in Table 1, coater dies 1 having the cross-sectional shape as shown in FIG. 1 and a width of 720 mm were prepared, and the surfaces of the coater dies 1 were coated under conditions as shown in Table 1. At this time, their front edge surfaces 11, center edge surfaces 12 and back edge surfaces 13 were within the center-line average roughness as defined in Japanese Patent O.P.I. Publication No. 207865/1990. In the covering of the hard film, each coater die was covered with the hard films as shown in Table 1 and in the thickness also as shown in Table 1, by ion plating at its whole surfaces of the front bar 11A, center bar 12A and back bar 13A including the front edge surface 11, the center edge surface 12, the back edge surface 13, walls of the first slit 15 and walls of the second slit 17. In carrying out the covering, the fastening members such as screws were unfastened to take the coater die apart into the bars 11A, 12A and 13A each, and thereafter the bars 11A, 12A and 13A, except their bottoms, were each covered with the hard film. After the covering was completed, they were assembled. At this time, test pieces of 30 mm×30 mm×5 mm each were prepared, which were made of the same material as the main bodies of the coater dies and had substantially the same surface roughness, and were simultaneously covered with the hard films. The coater dies shown in Table 1 were made of SUS630 in the case of stainless steel, WC type cemented carbide in the case of hard metal, and $ZPO_2$ in the case of ceramic.

Edge surfaces 11, 12 and 13 after coating were within the center-line average roughness as prescribed in Japanese Patent O.P.I. Publication No. 207865/1990, like those before coating.

The hardness of each film thus formed was measured using Shimadzu Dynamic Ultrafine Hardness Meter DUH-200, manufactured by Shimadzu Corporation. Since the above coater itself can not be placed on the ultrafine hardness meter because of its size and weight, the hardness of the film formed on the above test piece was measured.

Subsequently, the following upper-layer magnetic composition was kneaded and dispersed, and thus an upper-layer magnetic coating solution was prepared.

Upper-Layer Magnetic Composition

| | |
|---|---|
| Fe—Al ferromagnetic metal powder (average major axis length: 220 nm; X-ray particle diameter (average crystallite size): 20 nm; Hc: 1,600 Oe; σs: 120 emu/g) | 100 parts |
| Vinyl resin containing potassium sulfonate (MR-110, available from Nippon Zeon Co., Ltd.) | 10 parts |
| Polyurethane containing potassium sulfonate (UR-8700, available from Toyobo Co., Ltd.) | 5 parts |
| Alumina (average particle diameter: 0.6 μm) | 5 parts |
| Carbon black (average particle diameter: 30 mμ) | 1 part |
| Myristic acid | 1 part |
| Stearic acid | 1 part |
| Butyl stearate | 1 part |
| Cyclohexanone | 100 parts |
| Methyl ethyl ketone | 100 parts |
| Toluene | 100 parts |

A lower-layer magnetic coating solution was prepared by kneading and dispersion, which had the same composition as the upper-layer coating solution except that the above ferromagnetic metal powder was replaced with Co-γ-$Fe_2O_3$ powder (Hc: 800 Oe; average major axis length: 300 nm).

Next, 3 parts of polyisocyanate (Colonate L, available from Nippon Polyurethane Industry Co., Ltd. ) was added to each of the lower-layer coating solution and upper-layer coating solution thus obtained. Thereafter, using each of the coater dies as shown in Table 1, these coating solutions were continuously coated on the flexible beltlike material 2, a 7.5 μm thick polyethylene terephthalate film, at a coating speed CS of 300 m/min. Next, before the coatings became dry, they were subjected to magnetic field orientation at 3,000 Gauss, to form magnetic layers comprised of a lower layer having a dried coating thickness of 2.7 μm and an upper layer having a dried coating thickness of 0.3 μm. Coatability of the resulting magnetic layers was evaluated, and the results are shown in Table 1.

The coatability was evaluated at three points where a coating time of 50 hours, 150 hours or 300 hours had lapses from the initiation of coating. As evaluation criterions, the number of coating streak(s) per coating width was determined.

TABLE 1(A)

| Test example | Number of coating layer | Material of coater die | Hard film Material | Hard film Thickness | Film hardness after covering |
|---|---|---|---|---|---|
| Comparative Example: | | | | | |
| 1-1 | 2 | Stainless steel | None | — | — |
| 1-2 | 2 | Hard alloy | None | — | — |

TABLE 1(A)-continued

| Test example | Number of coating layer | Material of coater die | Hard film Material | Hard film Thickness | Film hardness after covering |
|---|---|---|---|---|---|
| 1-3 | 2 | Ceramic | None | — | — |
| 1-4 | 2 | Stainless steel | Ti-C | 1.8 μm | Hv 1,600 |
| 1-5 | 2 | Stainless steel | Ti-N | 1.5 μm | Hv 1,500 |
| Example: | | | | | |
| 1-1 | 2 | Stainless steel | DLC | 0.1 μm | Hv 2,800 |
| 1-2 | 2 | Hard alloy | DLC | 0.1 μm | Hv 2,800 |
| 1-3 | 2 | Stainless steel | Ti-N | 2.0 μm | Hv 2,400 |
| 1-4 | 2 | Hard alloy | Ti-N | 2.0 μm | Hv 2,400 |
| 1-5 | 2 | Stainless steel | Ti-C | 2.5 μm | Hv 2,000 |
| 1-6 | 2 | Stainless steel | Ti-C | 2.0 μm | Hv 1,700 |

TABLE 1(B)

| Test example | Number of streak(s) occurring per coating width 50 hours | 150 hours | 300 hours |
|---|---|---|---|
| Comparative Example: | | | |
| 1-1 | 1 | 6 | 35 |
| 1-2 | 2 | 2 | 8 |
| 1-3 | 1 | 2 | 5 |
| 1-4 | 0 | 2 | 6 |
| 1-5 | 0 | 3 | 7 |
| Example: | | | |
| 1-1 | 0 | 0 | 0 |
| 1-2 | 1 | 1 | 1 |
| 1-3 | 0 | 0 | 0 |
| 1-4 | 1 | 1 | 1 |
| 1-5 | 0 | 0 | 1 |
| 1-6 | 0 | 1 | 1 |

As is seen form the results shown in Table 1, a stable coatability can be achieved when the coater die is covered with the hard film having a film hardness (Vickers hardness) of not less than Hv 1,700.

EXAMPLE 2

Figure 2:
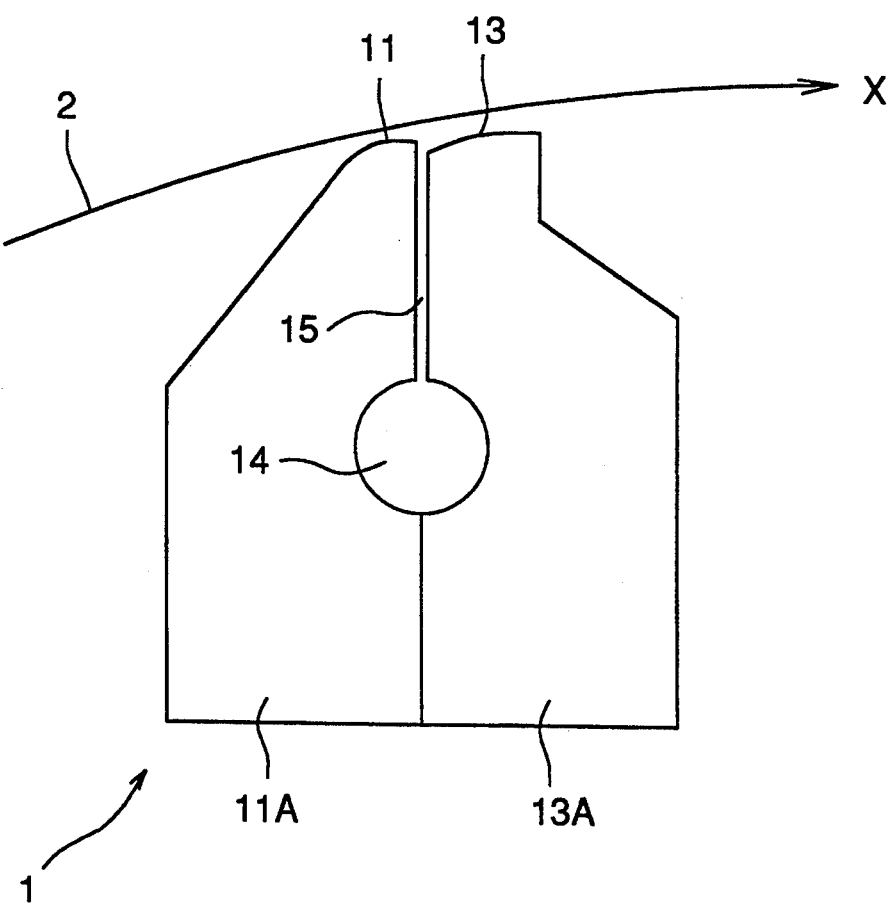
FIG. 2 is a cross-sectional illustration of another coater die used in the coating apparatus according to the present invention.

Using materials as shown in Table 2, coater dies 1 having the cross-sectional shape as shown in FIG. 2 and a width of 720 mm were prepared, and the surfaces of the coater dies 1 were coated under conditions as also shown in Table 2. At this time, each coater die was covered with the hard films in the same manner as in Example 1. After the covering was completed, the front bars 11A and 13A were assembled. The coater dies shown in Table 1 were made of SUS630 in the case of stainless steel, WC type cemented carbide in the case of hard metal and ZrO₂ in the case of ceramic, like those in Example 1.

Subsequently, the same upper layer coating solution as in Example 1 was prepared, and 3 parts of polyisocyanate (Colonate L, available from Nippon Polyurethane Industry Co., Ltd. ) was added thereto. Thereafter, using each of the coater dies as shown in Table 2, the coating solution was applied to a flexible beltlike material 2 formed of polyethylene terephthalate film of 10.0 μm thick, in a coating width of 700 mm at a coating speed CS of 300 m/min. Next, before the coating became dry, it was subjected to magnetic field orientation at 3,000 Gauss, to form a magnetic layer having a dried coating thickness of 2.0 μm. Coatability of the resulting magnetic layer was evaluated, and the results are shown in Table 2. The evaluation was made in the same manner as in Example 1.

The coater die shown in FIG. 2 has the same cross sectional shape as the one disclosed as Example by the present applicant in Japanese Patent O.P.I. Publication No. 288364/1989, and is designed for single-layer coating, different from the double-layer coating as the coater die of FIG. 1.

TABLE 2(A)

| Test example | Number of coating layer | Material of coater die | Hard film Material | Hard film Thickness | Film hardness after covering |
|---|---|---|---|---|---|
| Comparative Example: | | | | | |
| 2-1 | 1 | Stainless steel | None | — | — |
| 2-2 | 1 | Hard alloy | None | — | — |
| 2-3 | 1 | Ceramic | None | — | — |
| 2-4 | 1 | Stainless steel | Ti-C | 1.8 μm | Hv 1,600 |
| 2-5 | 1 | Hard alloy | Ti-N | 1.5 μm | Hv 1,500 |
| Example: | | | | | |
| 2-1 | 1 | Stainless steel | DLC | 0.1 μm | Hv 2,800 |
| 2-2 | 1 | Stainless steel | Ti-N | 2.0 μm | Hv 2,400 |
| 2-3 | 1 | Hard alloy | DLC | 0.1 μm | Hv 2,800 |
| 2-4 | 1 | Hard alloy | Ti-N | 2.0 μm | Hv 2,400 |

TABLE 2(B)

| Test example | Number of streak(s) occurring per coating width 50 hours | 150 hours | 300 hours |
|---|---|---|---|
| Comparative Example: | | | |
| 2-1 | 1 | 12 | 40 |
| 2-2 | 3 | 5 | 11 |
| 2-3 | 3 | 3 | 7 |
| 2-4 | 2 | 3 | 6 |
| 2-5 | 1 | 5 | 8 |
| Example: | | | |
| 2-1 | 0 | 0 | 0 |
| 2-2 | 1 | 1 | 1 |
| 2-3 | 0 | 0 | 0 |
| 2-4 | 1 | 1 | 1 |

As is seen from the results shown in Table 2, a stable coatability can be achieved when the coater die is covered with the hard film having a film hardness (Vickers hardness) of not less than Hv 1,700.

As described above, according to the present invention, the extrusion coater die of the coating apparatus is covered with the hard film having a film hardness after covering (Vickers hardness) of not less than Hv 1,700, at its part (s) coming into touch with the flexible beltlike material and/or the coating solution. Hence, the coater die can be molded with ease and at a low cost and also it is possible to provide a coating apparatus that can achieve a stable coatability.

What is claimed is:

1. An apparatus for extrusion coating a coating solution on a continuously running belt material, said apparatus comprising a coater die having at least one slit, each slit being provided between a respective pair of edges, wherein a part of said coater die which contacts said belt material or said coating solution, is covered with a film having a Vickers hardness of not less than HV 1700, said film being deposited on the die by an ion plating method, said film being formed of TiN, TiC, or diamond-like carbon.

2. The apparatus of claim 1, wherein said part of said coater die is one of said edges.

3. The apparatus of claim 1, wherein said part of said coater die is said slit.

4. The apparatus of claim 1, wherein said part of said coater die is said plurality of edges and has a center-line average roughness of not more than 5.0 μm.

5. The apparatus of claim 1, wherein said coater die is made of stainless steel.

* * * * *